United States Patent
Takada et al.

(10) Patent No.: US 11,904,837 B2
(45) Date of Patent: Feb. 20, 2024

(54) HYBRID VEHICLE

(71) Applicant: Toyota Jidosha Kabushiki Kaisha, Toyota (JP)

(72) Inventors: Norifumi Takada, Mishima (JP); Teppei Yoshioka, Susono (JP); Hiroki Tsunogawa, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 242 days.

(21) Appl. No.: 17/401,859

(22) Filed: Aug. 13, 2021

(65) Prior Publication Data

US 2022/0055610 A1 Feb. 24, 2022

(30) Foreign Application Priority Data

Aug. 18, 2020 (JP) ................. 2020-138189

(51) Int. Cl.
*B60W 20/19* (2016.01)
*B60K 6/442* (2007.10)
*B60W 10/06* (2006.01)
*B60W 10/08* (2006.01)
*B60W 50/00* (2006.01)

(52) U.S. Cl.
CPC ............ *B60W 20/19* (2016.01); *B60K 6/442* (2013.01); *B60W 10/06* (2013.01); *B60W 10/08* (2013.01); *B60W 2050/0026* (2013.01); *B60W 2510/0657* (2013.01); *B60W 2510/083* (2013.01); *B60W 2540/10* (2013.01); *B60W 2710/021* (2013.01);
(Continued)

(58) Field of Classification Search
CPC ...... B60W 20/19; B60W 10/06; B60W 10/08; B60W 2050/0026; B60W 2510/0657; B60W 2510/083; B60W 2540/10; B60W 2710/021; B60W 2710/083; B60W 2720/106; B60K 6/442
See application file for complete search history.

(56) References Cited

U.S. PATENT DOCUMENTS

| | | | |
|---|---|---|---|
| 2019/0135103 A1* | 5/2019 | Kuze | B60K 6/543 |
| 2019/0152469 A1* | 5/2019 | Kim | B60K 6/52 |
| 2019/0232949 A1* | 8/2019 | Takasu | B60K 6/22 |

FOREIGN PATENT DOCUMENTS

JP 2019-142365 A 8/2019

* cited by examiner

*Primary Examiner* — Grant Moubry
*Assistant Examiner* — Ruben Picon-Feliciano
(74) *Attorney, Agent, or Firm* — Dinsmore & Shohl LLP

(57) ABSTRACT

A hybrid vehicle includes: an engine; first and second rotating electric machines; a connection/disconnection mechanism; a power storage device; and a control device. Further, when an acceleration request occurs during EV traveling mode, the control device controls, when determining that a predetermined acceleration smaller than a requested acceleration and corresponding to a vehicle speed cannot be generated by torque output by the second rotating electric machine, the torque output by the second rotating electric machine so as to generate an acceleration less than the predetermined acceleration while controlling the torque by the engine and torque by the first rotating electric machine, and when determining that the predetermined acceleration cannot be generated by the torque output by the second rotating electric machine, controls the torque output by the second rotating electric machine so as to generate the acceleration equal to or greater than the predetermined acceleration.

9 Claims, 7 Drawing Sheets

(52) U.S. Cl.
CPC . *B60W 2710/083* (2013.01); *B60W 2720/106* (2013.01)

| VEHICLE SPEED V [m/s] | 0 | 10 | 20 | 30 | ... |
|---|---|---|---|---|---|
| ACCELERATION G0 [m/s$^2$] | aaa | bbb | ccc | ddd | ... |

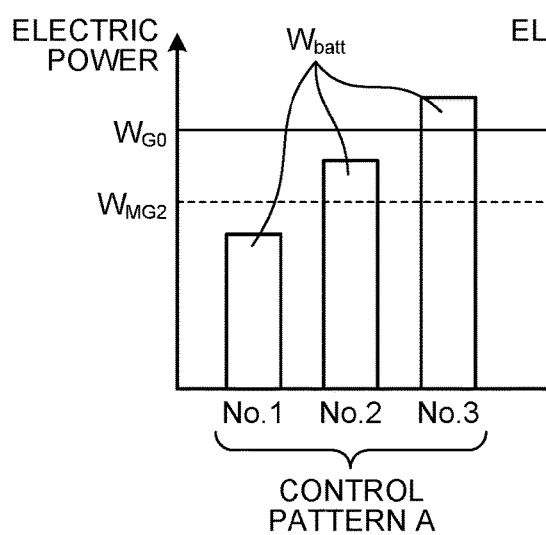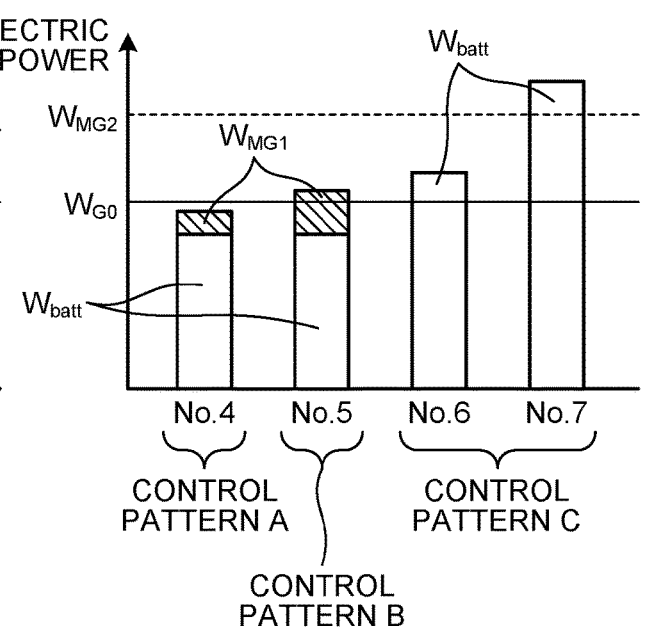

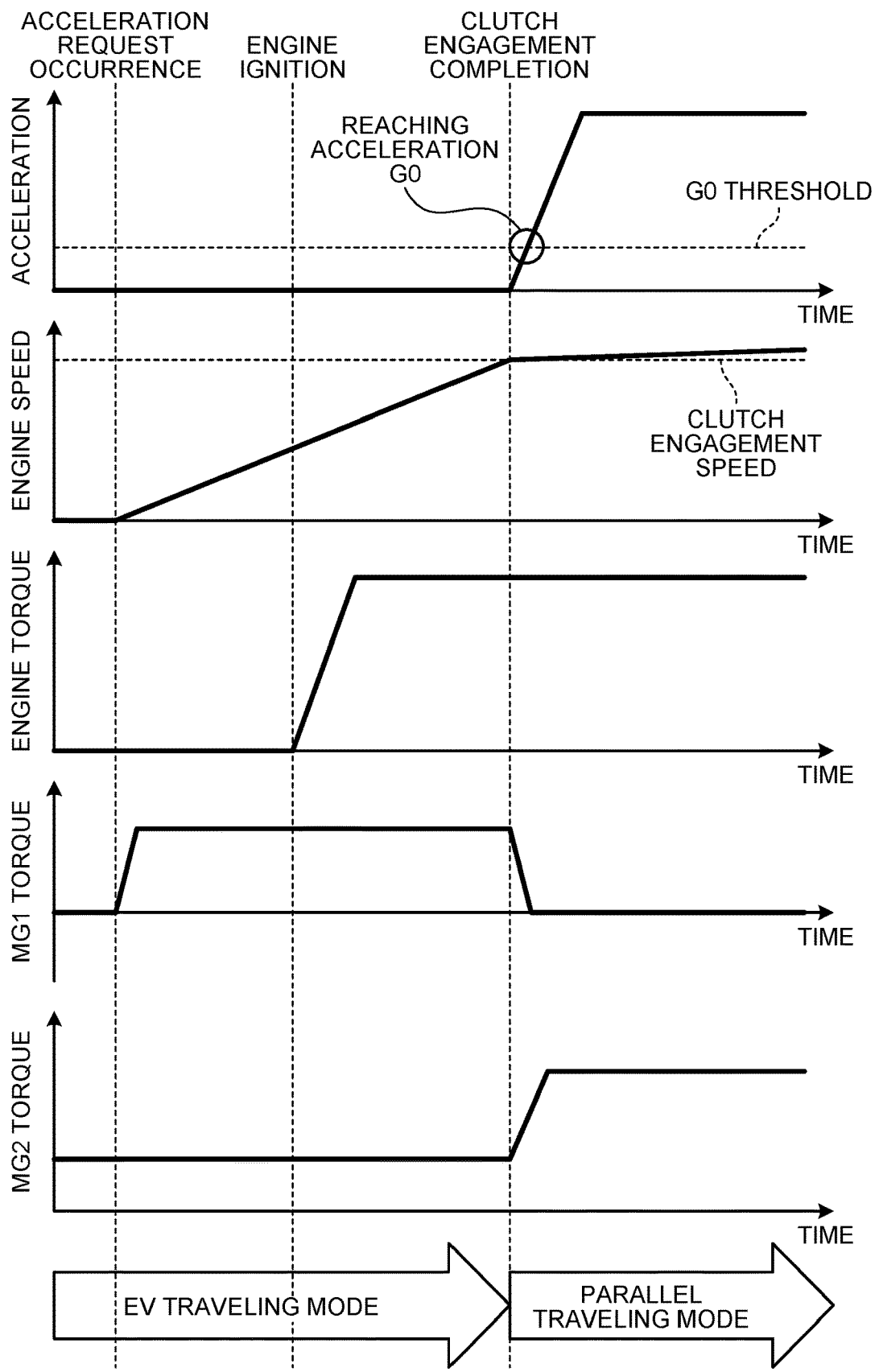

HYBRID VEHICLE

CROSS-REFERENCE TO RELATED APPLICATION(S)

The present application claims priority to and incorporates by reference the entire contents of Japanese Patent Application No. 2020-138189 filed in Japan on Aug. 18, 2020.

BACKGROUND

The present disclosure relates to a hybrid vehicle.

Japanese Laid-open Patent Publication No. 2019-142365 discloses a hybrid vehicle including an engine, a first motor coupled to the engine, a clutch that selectively connects and disconnects a power transmission path between the engine and the first motor, and driving wheels, and a second motor coupled to the driving wheels in such a manner as to be able to transmit power. This hybrid vehicle is capable of traveling based on a required driving force by selecting either an EV traveling mode in which the clutch is disengaged to disconnect the engine from the power transmission path to travel using the second motor as a driving force source or a parallel traveling mode in which the clutch is engaged to connect the engine to the power transmission path to travel using the engine and the second motor as driving force sources.

SUMMARY

There is a need for providing a hybrid vehicle capable of generating a predetermined acceleration at an early stage from a time when an acceleration request occurs According to an embodiment, A hybrid vehicle includes: an engine; a first rotating electric machine arranged on a power transmission path from the engine to wheels and on an output side of the engine and having a function of generating electricity by being driven by receiving at least torque output by the engine; a connection/disconnection mechanism to selectively connect and disconnect the power transmission path; a second rotating electric machine coupled to the wheels in such a manner as to be able to transmit power; a power storage device connected to the first rotating electric machine and the second rotating electric machine; and a control device to control the engine, the first rotating electric machine, the second rotating electric machine, and the connection/disconnection mechanism, in which the hybrid vehicle travels by selecting any one of: an EV traveling mode to travel by stopping the engine to drive the wheels by torque output by the second rotating electric machine; a parallel traveling mode to travel by operating the engine while the power transmission path is connected by the connection/disconnection mechanism to drive the wheels by the torque output by the engine and the torque output by the second rotating electric machine; and a series traveling mode to travel by operating the engine while the power transmission path is disconnected by the connection/disconnection mechanism to drive the first rotating electric machine by the torque output by the engine to generate electricity and to drive the wheels by the torque output by the second rotating electric machine. Further, when an acceleration request occurs during traveling in the EV traveling mode, the control device controls, when determining that a predetermined acceleration smaller than a requested acceleration and corresponding to a vehicle speed is not able to be generated by the torque output by the second rotating electric machine, the torque output by the second rotating electric machine in such a manner as to generate an acceleration less than the predetermined acceleration while controlling the torque output by the engine and torque output by the first rotating electric machine, and when determining that the predetermined acceleration is able to be generated by the torque output by the second rotating electric machine, controls the torque output by the second rotating electric machine in such a manner as to generate the acceleration equal to or greater than the predetermined acceleration.

BRIEF DESCRIPTION OF THE DRAWINGS

FIG. 4A is a diagram illustrating an example of a determination criterion for determining whether acceleration G0 can be output when the electric power of a second rotating electric machine required to generate the acceleration G0 is greater than the electric power required for the maximum output of the second rotating electric machine;

FIG. 4B is a diagram illustrating an example of a determination criterion for determining whether the acceleration G0 can be output when the electric power required for the maximum output of the second rotating electric machine is greater than the electric power of the second rotating electric machine required to generate the acceleration G0;

FIG. 5 is a timing chart illustrating an example of acceleration control by a control pattern A;

DETAILED DESCRIPTION

In the related art, when an acceleration request occurs during driving in the EV traveling mode to accelerate the vehicle, it is conceivable that the clutch is engaged to shift to the parallel traveling mode to accelerate the vehicle using not only the torque output by the motor but also the torque output by the engine. However, the responsiveness of the torque output by the engine is generally slower than that by the motor, and a driver feels less acceleration. On the other hand, the feeling of acceleration received by a driver depends not on the time from the occurrence of the acceleration request to the generation of the requested acceleration according to the accelerator opening but on the time from the occurrence of the acceleration request to the time when the minimum acceleration felt by the driver is exceeded.

Hereinafter, an embodiment of a hybrid vehicle according to the present disclosure will be described. Note that, the present disclosure is not limited to the following embodiment.

Figure 1:
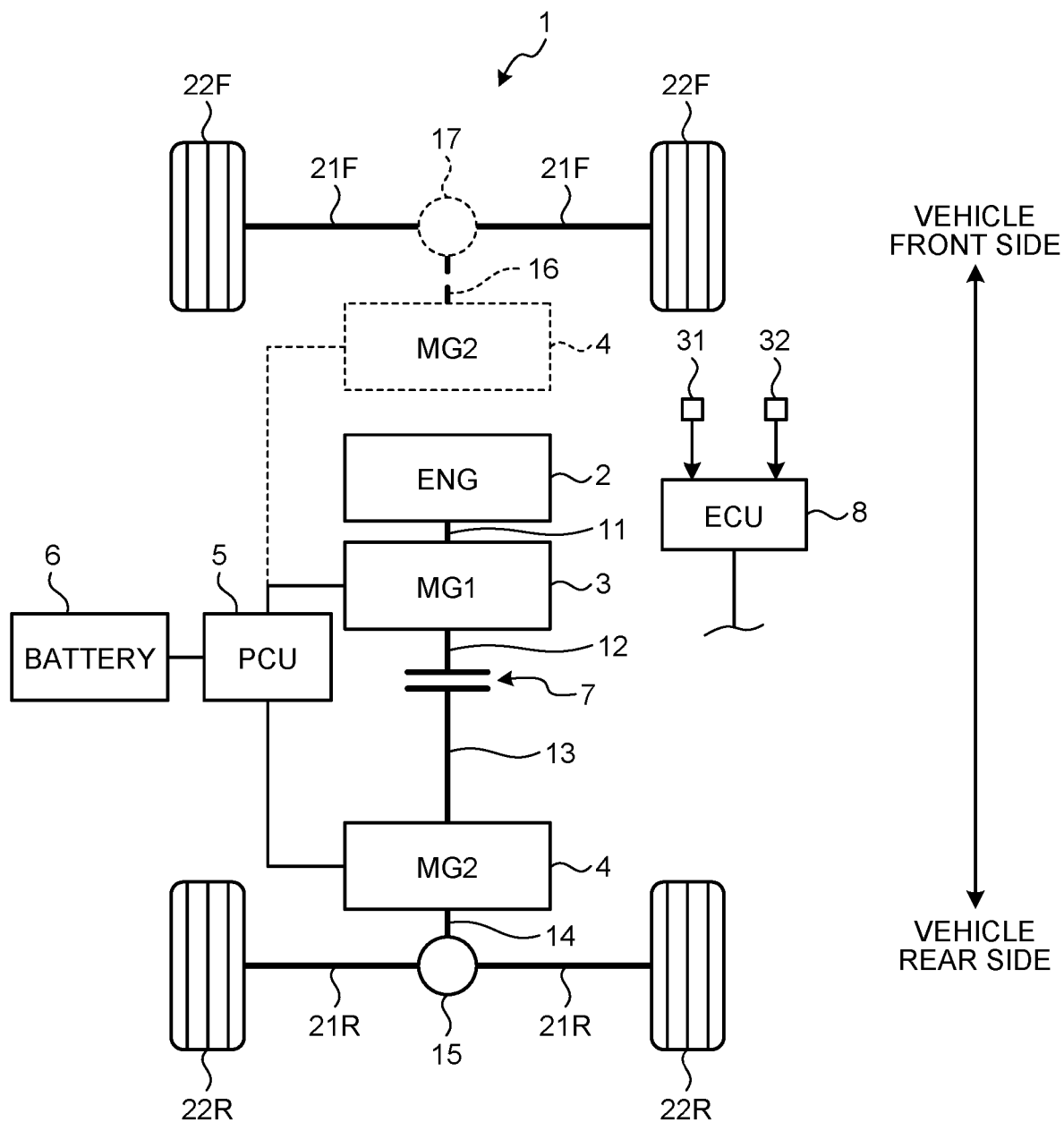
FIG. 1 is a diagram schematically illustrating a power train of a hybrid vehicle according to an embodiment.

FIG. 1 is a diagram schematically illustrating a power train of a hybrid vehicle according to an embodiment. A hybrid vehicle 1 illustrated in FIG. 1 includes an engine (ENG) 2, a first rotating electric machine (MG1) 3, and a second rotating electric machine (MG2) 4 as power sources. In addition, the hybrid vehicle 1 according to the embodiment includes, as other main component elements, a power control unit (PCU) 5, a battery 6 as a power storage device, a clutch 7, an electronic control unit (ECU) 8 as a control device, an output shaft 11, an output shaft 12, an input shaft 13, a rear propeller shaft 14, a rear differential gear 15, rear drive shafts 21R, rear wheels 22R, a front propeller shaft 16, a front differential gear 17, front drive shafts 21F, front wheels 22F, a vehicle speed sensor 31, and an accelerator opening sensor 32.

The engine 2 is, for example, an internal combustion engine, such as a gasoline engine, a diesel engine or the like, and is configured in such a manner that operating states, such as output adjustment, start, stop and the like, are electrically controlled.

The first rotating electric machine 3, the clutch 7, and the second rotating electric machine 4 are arranged in order on the output side of the engine 2 and on the same axis as the engine 2.

The first rotating electric machine 3 is coupled to the output shaft 11 of the engine 2 and has a function as a generator that generates electricity by being driven by receiving the engine torque output by the engine 2 and a function as an electric motor that outputs rotary electric torque by being driven by supplied electric power. That is, the first rotating electric machine 3 is a motor generator having a power generation function and is implemented by, for example, a permanent magnet type synchronous motor, an induction motor or the like. In addition, the first rotating electric machine 3 is connected to the battery 6 via the PCU 5. Thus, the first rotating electric machine 3 can be driven as a generator, and the electric power generated at that time can be stored in the battery 6 or supplied to the second rotating electric machine 4. Furthermore, the electric power stored in the battery 6 can be used to drive the first rotating electric machine 3 to output torque.

The clutch 7 is a connection/disconnection mechanism that selectively connects and disconnects the power transmission path between the engine 2 and the first rotating electric machine 3, and the rear wheels and is a hydraulic friction engagement device. The clutch 7 includes a drive-side friction plate coupled to the output shaft 12 of the first rotating electric machine 3 and a driven-side friction plate coupled to the input shaft 13 of the second rotating electric machine 4. Then, the friction plates come into contact with each other to be in an engaged state as the oil pressure supplied from an oil pump (not illustrated) is increased, and the power transmission path between the engine 2 and the first rotating electric machine 3, and the rear wheels 22R is connected. In addition, the friction plates are separated from each other to be in a released state as the oil pressure is lowered, and the power transmission path between the engine 2 and the first rotating electric machine 3, and the rear wheels 22R is disconnected. Note that, the clutch 7 can be implemented by a multi-plate clutch in which a plurality of drive-side friction plates and a plurality of driven-side friction plates are provided and each drive-side friction plate and each driven-side friction plate are alternately arranged.

In the present embodiment, the clutch 7 is provided as a connection/disconnection mechanism that selectively connects and disconnects the power transmission path between the engine 2 and the first rotating electric machine 3, and the rear wheels 22R, but the connection/disconnection mechanism is not limited thereto. For example, the connection/disconnection mechanism is only required to be implemented by providing at least one of a clutch, a torque converter, and a transmission to selectively connect and disconnect the power transmission path between the engine 2 and the first rotating electric machine 3, and the rear wheels 22R in such a manner as to operate each of the engine 2 and the first rotating electric machine 3 at an independent rotation speed.

The second rotating electric machine 4 is coupled to the left and right rear wheels in such a manner as to be able to transmit power. The second rotating electric machine 4 has a function as a prime mover that outputs motor torque by being driven by supplied electric power and a function as a generator that generates electricity by being driven by receiving torque from the outside. That is, the second rotating electric machine 4 is, similarly to the first rotating electric machine 3, a motor generator having a power generation function and is implemented by, for example, a permanent magnet type synchronous motor, an induction motor or the like. The second rotating electric machine 4 is connected to the battery 6 via the PCU 5, and the second rotating electric machine 4 can be driven by electricity from the battery 6 to output motor torque. In addition, since the second rotating electric machine 4 is coupled to the rear wheels in such a manner as to be able to transmit power, the second rotating electric machine 4 is driven as a generator by the torque transmitted from the rear wheels, and the electric power generated thereby can be stored in the battery 6. Furthermore, the first rotating electric machine 3 and the second rotating electric machine 4 are connected to each other via the PCU 5 in such a manner that electric power can be exchanged with each other, and the electricity generated by the first rotating electric machine 3 can be directly supplied to the second rotating electric machine 4 in order for the second rotating electric machine 4 to output motor torque.

The rotor shaft of the second rotating electric machine 4 is coupled to the rear propeller shaft 14. A rear propeller shaft 14 extends rearward from the second rotating electric machine 4 in the front-rear direction of the hybrid vehicle 1. The rear propeller shaft 14 is coupled to the rear differential gear 15. The rear differential gear 15 is coupled to the left and right rear wheels (driving wheels) 22R via the left and right rear drive shafts 21R.

The ECU 8 is implemented by, for example, a microcomputer as a main body and is configured to perform calculation using input data or data stored in advance, to output the result of the calculation as a control command signal, and to control the engine 2, the PCU 5, and the like. The data input to the ECU 8 is data from various sensors, such as the vehicle speed sensor 31, the accelerator opening sensor 32 and the like, and switches or from other systems.

Note that, the hybrid vehicle 1 according to the embodiment may be configured, as illustrated by a broken line in FIG. 1, by arranging the second rotating electric machine 4 on the vehicle front side to transmit the torque output by the second rotating electric machine 4 to the left and right front wheels 22F via the front propeller shaft 16, the front differential gear 17, and the left and right front drive shafts 21F in such a manner as to rotationally drive the left and right front wheels 22F.

The hybrid vehicle 1 according to the embodiment is capable of traveling by setting any one of a plurality of traveling modes of an EV traveling mode, a series traveling mode, and a parallel traveling mode.

The EV traveling mode is a traveling mode to drive the hybrid vehicle 1 by the motor torque output by the second rotating electric machine 4 while the clutch 7 is released and the engine 2 and the first rotating electric machine 3 are stopped.

The series traveling mode is a traveling mode for the hybrid vehicle 1 to travel by the motor torque of the second rotating electric machine 4 by operating the engine 2 while the clutch 7 is released, driving the first rotating electric machine 3 by the engine 2 to generate electricity, and driving the second rotating electric machine 4 by the electric power generated by the first rotating electric machine 3.

The parallel traveling mode is a traveling mode for the hybrid vehicle 1 to travel by the engine torque and the motor torque of the second rotating electric machine 4 by operating the engine 2 while the clutch 7 is engaged. In this parallel traveling mode, the hybrid vehicle 1 can be driven by the motor torque output by the first rotating electric machine 3 in addition to the engine torque and the motor torque of the second rotating electric machine 4. In addition, in the parallel traveling mode, the reaction torque against the target engine torque is controlled to be output by the first rotating electric machine 3. In this case, regenerative control for causing the first rotating electric machine 3 to function as a generator can be performed.

In the EV traveling mode, the series traveling mode, and the parallel traveling mode, regenerative control is performed to cause the second rotating electric machine 4 to function as a generator during deceleration or the like, and the electric power generated thereby can be stored in the battery 6.

Here, in a hybrid vehicle, requested acceleration G is generally desired to be generated immediately in response to a driver's acceleration request. However, during acceleration from traveling in the EV traveling mode, the driver feels less acceleration due to the time lag from the acceleration request to the engine start. The feeling of large time lag received by the driver depends not on the time from the occurrence of the acceleration request to the generation of the requested acceleration G according to the accelerator opening but on the time from the occurrence of the acceleration request to the time when the minimum acceleration G0 that is smaller than the requested acceleration G and felt by the driver is exceeded. For this reason, in the hybrid vehicle 1 according to the embodiment, the ECU 8 is capable of performing acceleration control to generate the minimum acceleration G0 felt by the driver at an early stage from a time when an acceleration request occurs at the time when the acceleration request occurs during traveling in the EV traveling mode.

Figures 2, 3:
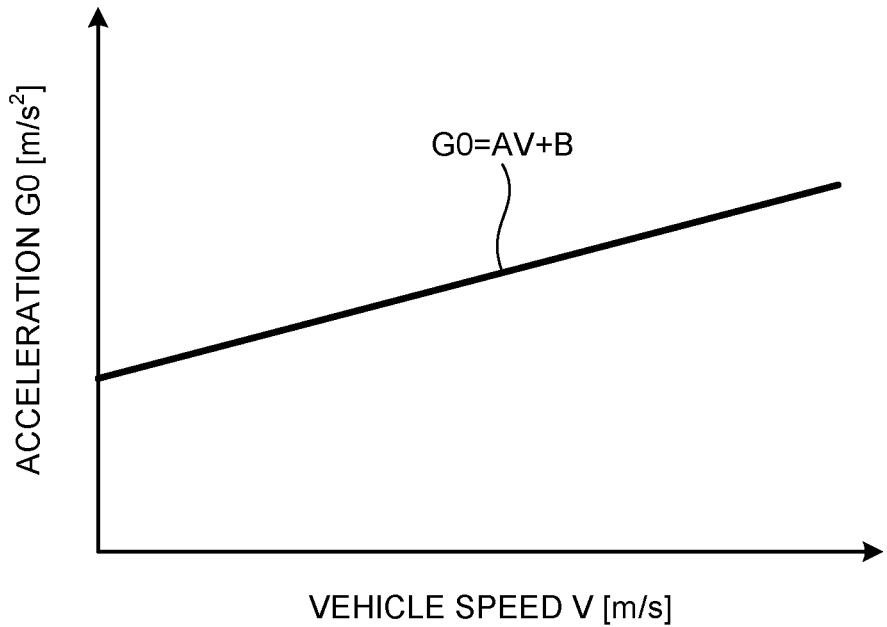
FIG. 2 is a diagram illustrating an example of a predetermined function representing the relationship between vehicle speed V and acceleration G0.
FIG. 3 is a diagram illustrating an example of a map representing the relationship between the vehicle speed V and the acceleration G0.

FIG. 2 is a diagram illustrating an example of a predetermined function representing the relationship between the vehicle speed V and the acceleration G0. FIG. 3 is a diagram illustrating an example of a map representing the relationship between the vehicle speed V and the acceleration G0.

The minimum acceleration G0 felt by the driver is smaller than the requested acceleration G according to the accelerator opening, is, for example, a predetermined acceleration corresponding to the vehicle speed V at the time of the acceleration request (the initial vehicle speed before acceleration), and tends to become greater as the vehicle speed V at the time of the acceleration request (the initial vehicle speed before acceleration) is greater. Thus, in the present embodiment, the acceleration G0 with respect to the vehicle speed V is defined by, for example, a linear function (the linear expression of the vehicle speed V) of G0=AV+B (where, A and B are constants), which is a predetermined function representing the relationship between the vehicle speed V and the acceleration G0, as illustrated in FIG. 2 or by a map indicating the relationship between the vehicle speed V and the acceleration G0 as illustrated in FIG. 3 in order to set the acceleration G0 used for the acceleration control.

In the hybrid vehicle 1 according to the embodiment, when determining that the acceleration G0 cannot be generated by the torque output by the second rotating electric machine 4 during traveling in the EV traveling mode, the ECU 8 controls the torque output by the second rotating electric machine 4 in such a manner as to generate acceleration less than the acceleration G0 while controlling the first rotating electric machine 3 and the engine 2. On the other hand, when determining that the acceleration G0 can be generated using the torque output by the second rotating electric machine 4 during traveling in the EV traveling mode, the ECU 8 controls the torque output by the second rotating electric machine 4 in such a manner as to generate acceleration equal to or greater than the acceleration G0 using the second rotating electric machine 4.

In addition, when the electric power required for the maximum output of the second rotating electric machine 4 or the electric power supplied from the battery 6 and the first rotating electric machine 3 to the second rotating electric machine 4 is less than the electric power of the second rotating electric machine 4 required to generate the acceleration G0, the ECU 8 determines that the acceleration G0 cannot be generated by the torque output by the second rotating electric machine 4.

Furthermore, when the electric power supplied from the battery 6 and the first rotating electric machine 3 to the second rotating electric machine 4 or the electric power supplied from the battery 6 alone to the second rotating electric machine 4 is equal to or greater than the electric power of the second rotating electric machine 4 required to generate the acceleration G0, the ECU 8 determines that the acceleration G0 can be generated using the torque output by the second rotating electric machine 4.

FIG. 4A is a diagram illustrating an example of a determination criterion for determining whether the acceleration G0 can be output when the electric power of the second rotating electric machine 4 required to generate the acceleration G0 is greater than the electric power required for the maximum output of the second rotating electric machine 4. In FIG. 4A, $W_{batt}$ is the maximum output electric power that can be supplied from the battery 6 to the second rotating electric machine 4. In FIG. 4A, $W_{MG2}$ is the electric power required for the maximum output of the second rotating electric machine 4. In addition, in FIG. 4A, $W_{G0}$ is the electric power of the second rotating electric machine 4 required to generate the acceleration G0.

In FIG. 4A, "No. 1" indicates that the maximum output electric power $W_{batt}$ that can be supplied from the battery 6 to the second rotating electric machine 4 is smaller than the electric power $W_{MG2}$ required for the maximum output of the second rotating electric machine 4 and the electric power $W_{G0}$ of the second rotating electric machine 4 required to generate the acceleration G0. In FIG. 4A, "No. 2" indicates that the maximum output electric power $W_{batt}$ that can be supplied from the battery 6 to the second rotating electric machine 4 is greater than the electric power $W_{MG2}$ required for the maximum output of the second rotating electric machine 4 and is smaller than the electric power $W_{G0}$ of the second rotating electric machine 4 required to generate the acceleration G0. In FIG. 4A, "No. 3" indicates that the maximum output electric power $W_{batt}$ that can be supplied from the battery 6 to the second rotating electric machine 4 is greater than the electric power $W_{MG2}$ required for the maximum output of the second rotating electric machine 4 and the electric power $W_{G0}$ of the second rotating electric machine 4 required to generate the acceleration G0.

As illustrated in FIG. 4A, in any of the cases of "No. 1" to "No. 3", the electric power $W_{G0}$ of the second rotating electric machine 4 required to generate the acceleration G0 is greater than the electric power $W_{MG2}$ required for the maximum output of the second rotating electric machine 4, regardless of the maximum output electric power $W_{batt}$ that can be supplied from the battery 6 to the second rotating electric machine 4. Thus, the ECU 8 determines that the acceleration G0 cannot be generated by the torque output by the second rotating electric machine 4 (determination A) and selects a control pattern A described later with reference to FIG. 5.

FIG. 4B is a diagram illustrating an example of a determination criterion for determining whether the acceleration G0 can be output when the electric power $W_{MG2}$ required for the maximum output of the second rotating electric machine 4 is greater than the electric power $W_{G0}$ of the second rotating electric machine 4 required to generate the acceleration G0. In FIG. 4B, $W_{MG1}$ is the electric power of the maximum electric power generation amount of the first rotating electric machine 3. In FIG. 4B, $W_{batt}$ is the maximum output electric power that can be supplied from the battery 6 to the second rotating electric machine 4. In FIG. 4B, $W_{MG2}$ is the electric power required for the maximum output of the second rotating electric machine 4. In FIG. 4B, $W_{G0}$ is the electric power of the second rotating electric machine 4 required to generate the acceleration G0.

In FIG. 4B, "No. 4" indicates that the electric power supplied from the battery 6 and the first rotating electric machine 3 to the second rotating electric machine 4 ($W_{batt}$+$W_{MG1}$) obtained by adding the maximum output electric power $W_{batt}$ that can be supplied from the battery 6 to the second rotating electric machine 4 to the electric power $W_{MG1}$ of the maximum electric power generation amount of the first rotating electric machine 3 is smaller than the electric power $W_{G0}$ of the second rotating electric machine 4 required to generate the acceleration G0 and the electric power $W_{MG2}$ required for the maximum output of the second rotating electric machine 4.

As illustrated in FIG. 4B, in the case of "No. 4", the electric power ($W_{batt}$+$W_{MG1}$) supplied from the battery 6 and the first rotating electric machine 3 to the second rotating electric machine 4 is less than the electric power of the second rotating electric machine 4 required to generate the acceleration G0. Thus, the ECU 8 determines that the acceleration G0 cannot be generated by the torque output by the second rotating electric machine 4 (determination A) and selects a control pattern A described later with reference to FIG. 5.

In FIG. 4B, "No. 5" indicates that the electric power supplied from the battery 6 and the first rotating electric machine 3 to the second rotating electric machine 4 ($W_{batt}$+$W_{MG1}$) obtained by adding the maximum output electric power $W_{batt}$ that can be supplied from the battery 6 to the second rotating electric machine 4 to the electric power $W_{MG1}$ of the maximum electric power generation amount of the first rotating electric machine 3 is greater than the electric power $W_{G0}$ of the second rotating electric machine 4 required to generate the acceleration G0 and is smaller than the electric power $W_{MG2}$ required for the maximum output of the second rotating electric machine 4.

As illustrated in FIG. 4B, in the case of "No. 5", the electric power ($W_{batt}$+$W_{MG1}$) supplied from the battery 6 and the first rotating electric machine 3 to the second rotating electric machine 4 is equal to or greater than the electric power $W_{G0}$ of the second rotating electric machine 4 required to generate the acceleration G0. Thus, the ECU 8 determines that the acceleration G0 can be generated by the torque output by the second rotating electric machine 4 using the electric power ($W_{batt}$+$W_{MG1}$) supplied from the battery 6 and the first rotating electric machine 3 to the second rotating electric machine 4 (determination B) and selects a control pattern B described later with reference to FIG. 6.

In FIG. 4B, "No. 6" indicates that the maximum output electric power $W_{batt}$ that can be supplied from the battery 6 to the second rotating electric machine 4 is greater than the electric power $W_{G0}$ of the second rotating electric machine 4 required to generate the acceleration G0 and is smaller than the electric power $W_{MG2}$ required for the maximum output of the second rotating electric machine 4. In FIG. 4B, "No. 7" indicates that the maximum output electric power $W_{batt}$ that can be supplied from the battery 6 to the second rotating electric machine 4 is greater than the electric power $W_{G0}$ of the second rotating electric machine 4 required to generate the acceleration G0 and the electric power $W_{MG2}$ required for the maximum output of the second rotating electric machine 4.

As illustrated in FIG. 4B, in the cases of "No. 6" and "No. 7", the maximum output electric power $W_{batt}$ that can be supplied from the battery 6 to the second rotating electric machine 4 is equal to or greater than the electric power $W_{G0}$ of the second rotating electric machine 4 required to generate the acceleration G0. Thus, the ECU 8 determines that the acceleration G0 can be generated by the torque output by the second rotating electric machine 4 using the electric power from the battery 6 alone (determination C) and selects a control pattern C described later with reference to FIG. 7.

FIG. 5 is a timing chart illustrating an example of acceleration control by the control pattern A. In FIG. 5, the MG1 torque is the torque output by the first rotating electric machine 3, the MG2 torque is the torque output by the second rotating electric machine 4, and the G0 threshold is the threshold of the acceleration G0. The same applies to FIGS. 6 and 7.

In the acceleration control by the control pattern A, shifting from the EV traveling mode to the parallel traveling mode is prioritized to generate the minimum acceleration G0 felt by the driver at an early stage from a time when an acceleration request occurs.

First, in the control pattern A, the second rotating electric machine 4 outputs, at the timing when the acceleration request occurs, the torque for maintaining the vehicle speed. In addition, at the timing when the acceleration request occurs, the remaining electric power of the battery 6 except for that to be used by the second rotating electric machine 4 is supplied to the first rotating electric machine 3, and the torque is output from the first rotating electric machine 3 to the engine 2 to start (crank) the engine 2 by the first rotating electric machine 3. Then, by keeping outputting the torque from the first rotating electric machine 3 to the engine 2 after the engine is ignited to assist the increase in the engine speed, the time until the engine speed reaches the clutch engagement speed at which the clutch 7 is engaged is reduced. Then, the clutch 7 is engaged at the timing when the engine speed reaches the clutch engagement speed, the vehicle is accelerated in the parallel traveling mode to generate the acceleration G0. Furthermore, the vehicle is continuously accelerated in the parallel traveling mode after reaching the acceleration G0 to the requested acceleration.

Figure 6:
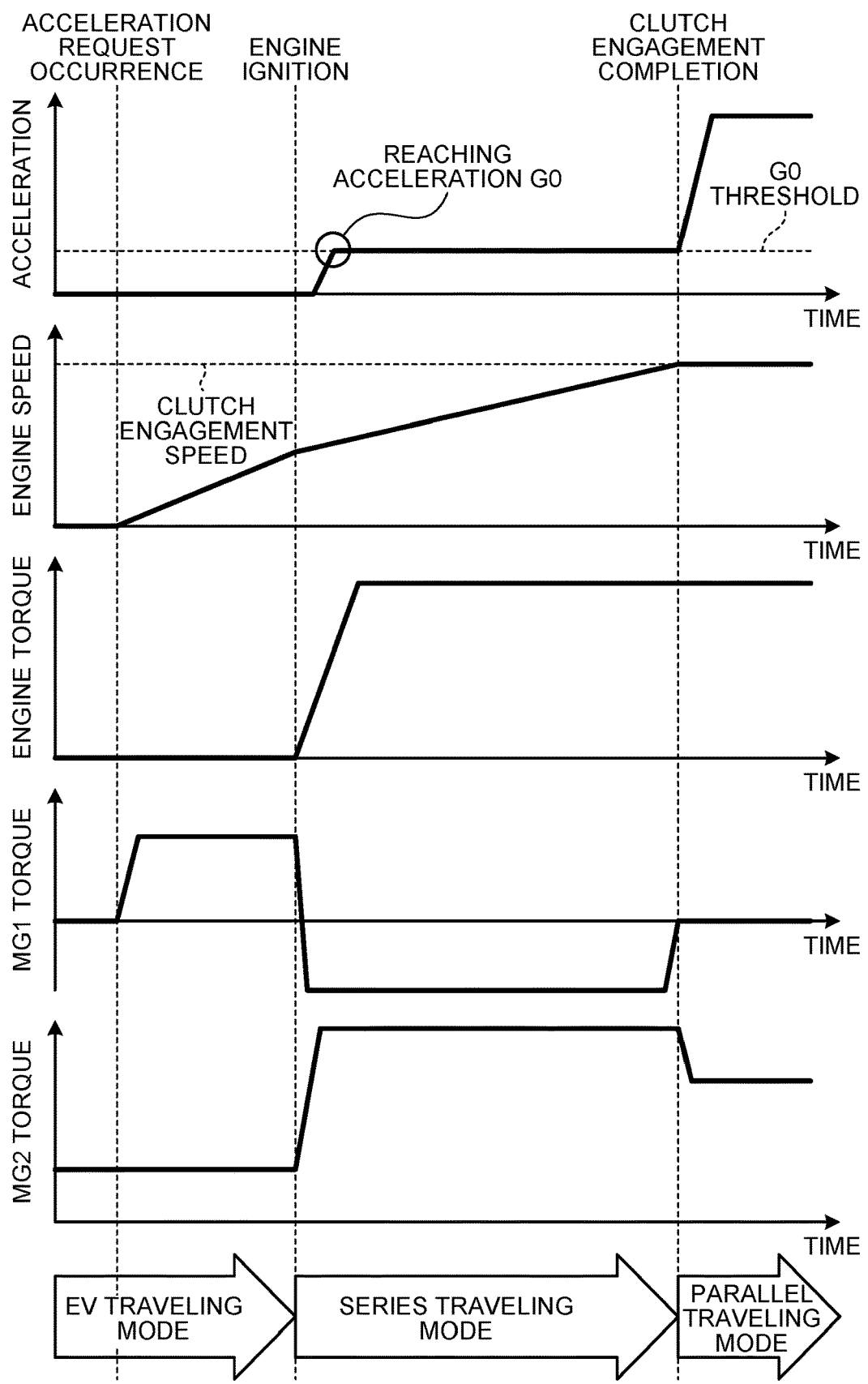
FIG. 6 is a timing chart illustrating an example of acceleration control by a control pattern B.

FIG. 6 is a timing chart illustrating an example of acceleration control by the control pattern B.

In the control pattern B, shifting from the EV traveling mode to the series traveling mode is prioritized to generate the minimum acceleration G0 felt by the driver at an early stage from a time when an acceleration request occurs.

First, in the control pattern B, the second rotating electric machine 4 outputs, at the timing when the acceleration request occurs, the torque for maintaining the vehicle speed. In addition, at the timing when the acceleration request occurs, the remaining electric power of the battery 6 except for that to be used by the second rotating electric machine 4 is supplied to the first rotating electric machine 3, and the torque is output from the first rotating electric machine 3 to the engine 2 to start (crank) the engine 2 by the first rotating electric machine 3. Then, after the engine is ignited, the first rotating electric machine 3 is driven using a part of the engine torque to generate electricity for the amount of electric power insufficient for the generation of the acceleration G0 by the second rotating electric machine 4. Then, the electric power $W_{G0}$ of the second rotating electric machine 4 required to generate the acceleration G0 is supplied to the second rotating electric machine 4 by adding the electric power generated by the first rotating electric machine 3 to the electric power supplied from the battery 6 to the second rotating electric machine 4, and the vehicle is accelerated in the series traveling mode by increasing the torque output by the second rotating electric machine 4 to generate the acceleration G0. Thereafter, while the acceleration G0 is maintained, the clutch 7 is engaged at the timing when the engine speed reaches the clutch engagement speed, and the vehicle is accelerated in the parallel traveling mode to the requested acceleration.

In the control pattern B, the acceleration G0 can be generated earlier than the control pattern A in which the acceleration G0 is generated after the increase in the engine speed and the clutch engagement.

Figure 7:
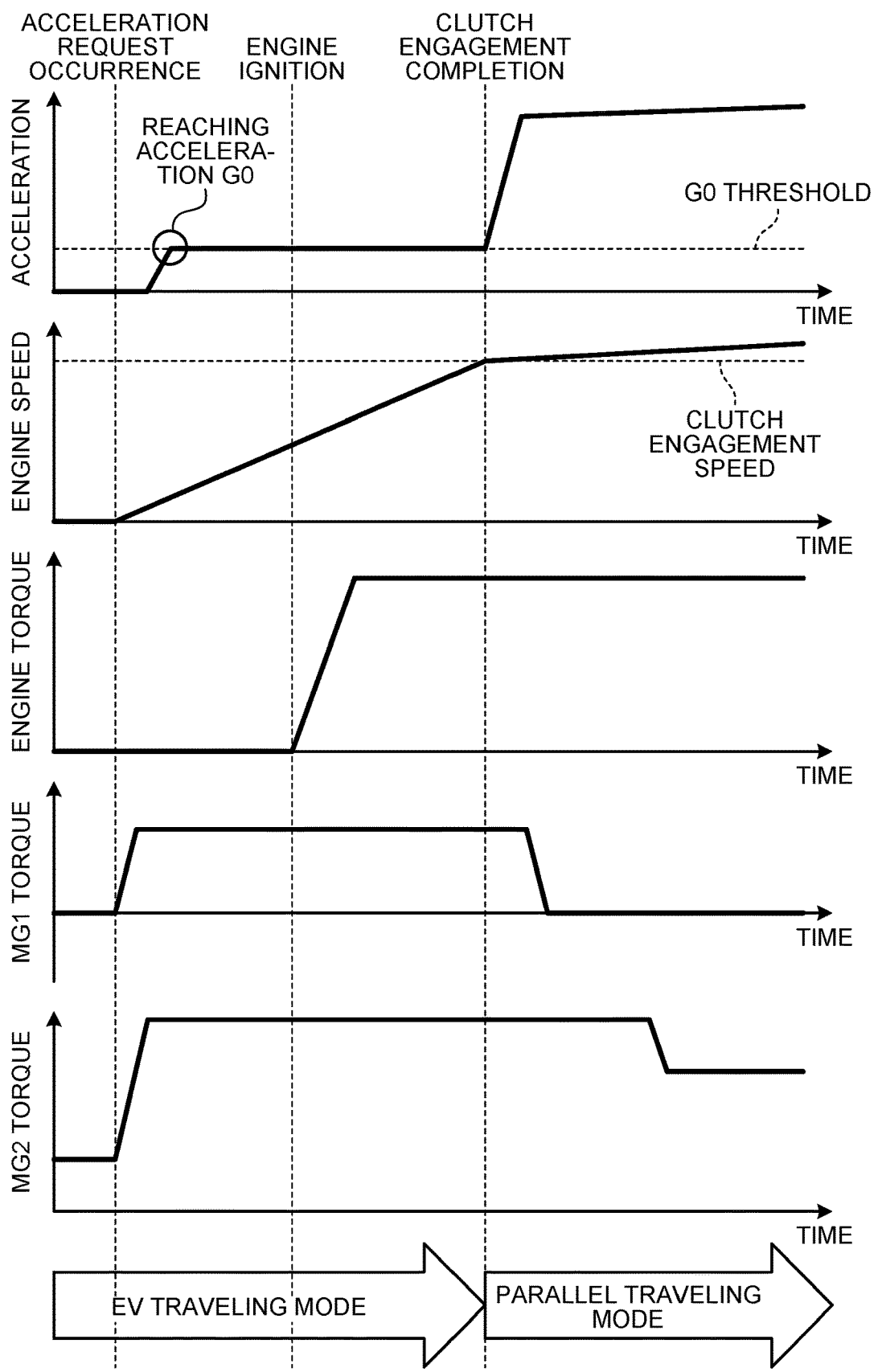
FIG. 7 is a timing chart illustrating an example of acceleration control by a control pattern C.

FIG. 7 is a timing chart illustrating an example of acceleration control by the control pattern C.

In the control pattern C, the generation of the acceleration G0 by accelerating the vehicle in the EV traveling mode is prioritized to generate the minimum acceleration G0 felt by the driver at an early stage from a time when an acceleration request occurs.

First, in the control pattern C, the second rotating electric machine 4 outputs, at the timing when the acceleration request occurs, the torque required to generate the acceleration G0 by supplying the electric power $W_{G0}$ of the second rotating electric machine 4 required to generate the acceleration G0 from the battery 6 to the second rotating electric machine 4, and the vehicle is accelerated in the EV traveling mode to generate the acceleration G0. At that time, the torque output by the second rotating electric machine 4 is limited to the minimum necessary amount for generating the acceleration G0. In addition, at the timing when the acceleration request occurs, the remaining electric power of the battery 6 except for that to be used by the second rotating electric machine 4 is supplied to the first rotating electric machine 3, and the torque is output from the first rotating electric machine 3 to the engine 2 to start (crank) the engine 2 by the first rotating electric machine 3. Then, by keeping outputting the torque from the first rotating electric machine 3 to the engine 2 after the engine is ignited to assist the increase in the engine speed, the time until the engine speed reaches the clutch engagement speed is reduced. Then, the clutch 7 is engaged at the timing when the engine speed reaches the clutch engagement speed, the vehicle is accelerated in the parallel traveling mode to the requested acceleration.

Figure 8:
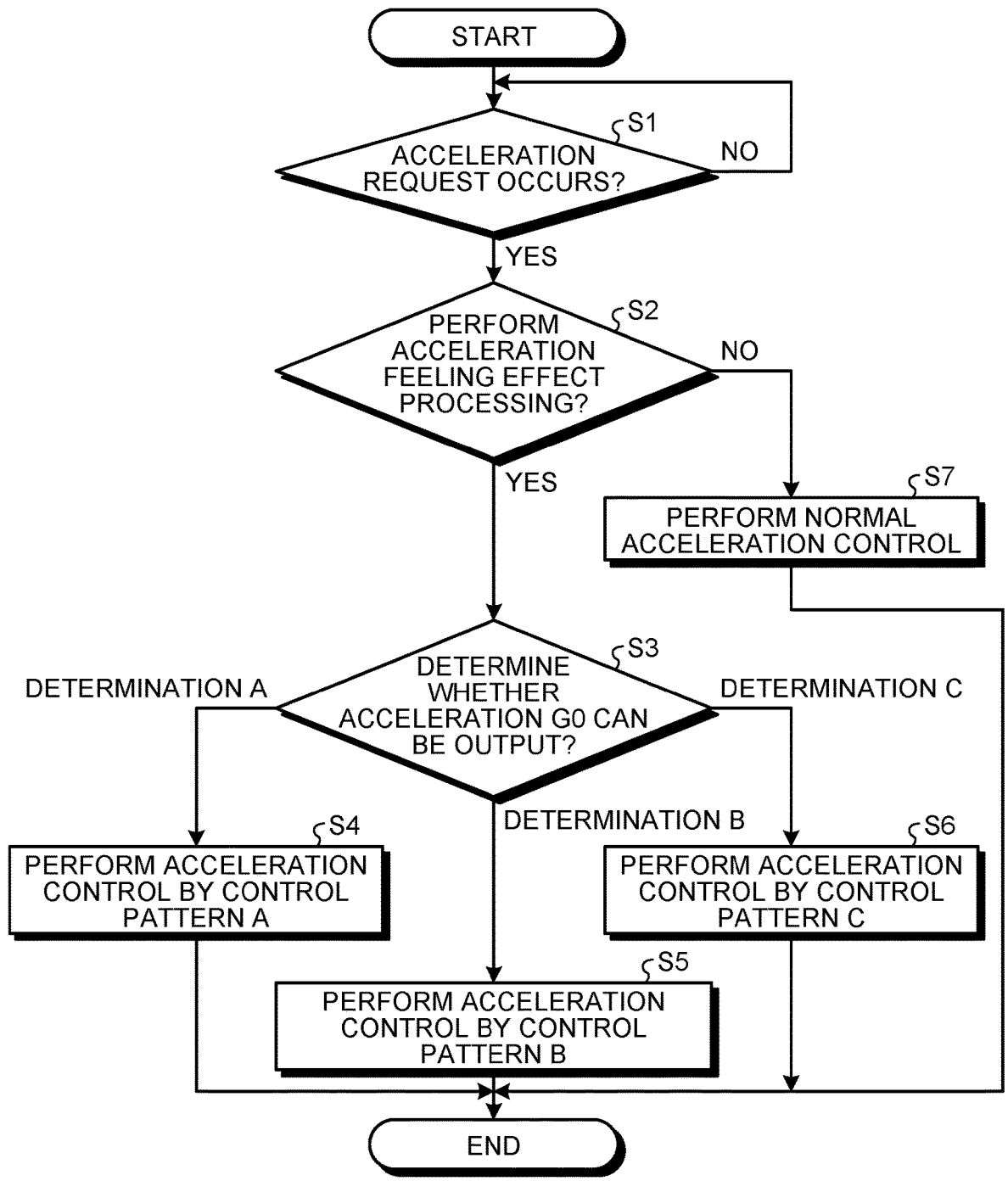
FIG. 8 is a flowchart illustrating an example of acceleration control from traveling in an EV traveling mode of a hybrid vehicle under the control of an ECU.

FIG. 8 is a flowchart illustrating an example of acceleration control from traveling in the EV traveling mode of the hybrid vehicle 1 under the control of the ECU 8.

First, the ECU 8 determines whether there is an acceleration request from the driver based on the accelerator opening from the accelerator opening sensor 32 (step S1). When determining that there is no acceleration request from the driver (No in step S1), the ECU 8 repeats the determination in step S1 until an acceleration request from the driver occurs.

On the other hand, when determining that an acceleration request from the driver occurs (Yes in step S1), the ECU 8 determines whether to perform acceleration feeling effect processing (step S2). The acceleration feeling effect processing is determined, for example, to be performed when the requested acceleration exceeds a predetermined threshold or not to be performed when the requested acceleration is equal to or less than the predetermined threshold. The predetermined threshold is defined by, for example, a map based on the current vehicle speed or the like. Alternatively, the predetermined threshold may be set according to the driving style of each driver by machine learning the driving state of each driver.

When determining that the acceleration feeling effect processing is to be performed (Yes in step S2), the ECU 8 determines whether the acceleration G0 can be output (step S3). Note that, the determination as to whether the acceleration G0 can be output is performed according to, for example, the determination criteria explained with reference to FIGS. 4A and 4B.

When the determination as to whether the acceleration G0 can be output is the determination A (determination A in step S3), the ECU 8 performs the acceleration control by the control pattern A described with reference to FIG. 5 (step S4) and terminates a series of controls. Alternatively, when the determination as to whether the acceleration G0 can be output is the determination B (determination B in step S3), the ECU 8 performs the acceleration control by the control pattern B described with reference to FIG. 6 (step S5) and terminates a series of controls. Alternatively, when the determination as to whether the acceleration G0 can be output is the determination C (determination C in step S3), the ECU 8 performs the acceleration control by the control pattern C described with reference to FIG. 7 (step S6) and terminates a series of controls.

When determining that the acceleration feeling effect processing is not performed in step S2 (No in step S2), the ECU 8 performs normal acceleration control (step S7) and terminates a series of controls. The normal acceleration control is, for example, a control for accelerating the vehicle to the requested acceleration while the EV traveling mode is maintained.

As described above, the hybrid vehicle 1 according to the embodiment can generate the minimum acceleration G0 felt by the driver at an early stage from a time when an acceleration request occurs in consideration of the output responsiveness of the engine 2 and the second rotating electric machine 4.

A hybrid vehicle according to the present disclosure has an effect that a predetermined acceleration can be generated at an early stage from a time when an acceleration request occurs, in consideration of the output responsiveness of an engine and a second rotating electric machine.

According to an embodiment, it is possible to generate a minimum acceleration felt by a driver at an early stage from a time when an acceleration request occurs, in consideration of the output responsiveness of the engine and the second rotating electric machine.

According to an embodiment, it is possible to preferentially shift from the EV traveling mode to the parallel traveling mode to perform a determination to generate the predetermined acceleration at an early stage.

According to an embodiment, it is possible to preferentially shift from the EV traveling mode to the parallel traveling mode to generate the predetermined acceleration at an early stage.

According to an embodiment, it is possible to preferentially shift from the EV traveling mode to the series traveling mode to perform a determination to generate the predetermined acceleration at an early stage.

According to an embodiment, it is possible to preferentially shift from the EV traveling mode to the series traveling mode to generate the predetermined acceleration at an early stage.

According to an embodiment, it is possible to preferentially generate the predetermined acceleration by accelerating the vehicle in the EV traveling mode to perform a determination to generate the predetermined acceleration at an early stage.

According to an embodiment, it is possible to preferentially generate the predetermined acceleration by accelerating the vehicle in the EV traveling mode to generate the predetermined acceleration at an early stage.

According to an embodiment, it is possible to appropriately set the predetermined acceleration that tends to increase as the vehicle speed increases.

According to an embodiment, it is possible to appropriately set the predetermined acceleration that tends to increase as the vehicle speed increases.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A hybrid vehicle comprising:
    an engine;
    a first rotating electric machine arranged on a power transmission path from the engine to wheels and on an output side of the engine and having a function of generating electricity by being driven by receiving at least torque output by the engine;
    a connection/disconnection mechanism configured to selectively connect and disconnect the power transmission path;
    a second rotating electric machine coupled to the wheels in such a manner as to be able to transmit power;
    a power storage device connected to the first rotating electric machine and the second rotating electric machine; and
    a control device configured to control the engine, the first rotating electric machine, the second rotating electric machine, and the connection/disconnection mechanism,
    the hybrid vehicle being configured to travel by selecting any one of:
        an EV traveling mode to travel by stopping the engine to drive the wheels by torque output by the second rotating electric machine;
        a parallel traveling mode to travel by operating the engine while the power transmission path is connected by the connection/disconnection mechanism to drive the wheels by the torque output by the engine and the torque output by the second rotating electric machine; and
        a series traveling mode to travel by operating the engine while the power transmission path is disconnected by the connection/disconnection mechanism to drive the first rotating electric machine by the torque output by the engine to generate electricity and to drive the wheels by the torque output by the second rotating electric machine, wherein
    when an acceleration request occurs during traveling in the EV traveling mode, the control device is configured to
    control, when determining that a predetermined acceleration smaller than a requested acceleration and corresponding to a vehicle speed is not able to be generated by the torque output by the second rotating electric machine, the torque output by the second rotating electric machine in such a manner as to generate an acceleration less than the predetermined acceleration while controlling the torque output by the engine and torque output by the first rotating electric machine, and
    when determining that the predetermined acceleration is able to be generated by the torque output by the second rotating electric machine, control the torque output by the second rotating electric machine in such a manner as to generate the acceleration equal to or greater than the predetermined acceleration.

2. The hybrid vehicle according to claim 1, wherein the control device is configured to
    determine, when electric power required for a maximum output of the second rotating electric machine or electric power supplied from the power storage device and the first rotating electric machine to the second rotating electric machine is less than electric power of the second rotating electric machine required to generate the predetermined acceleration, that the predetermined acceleration is not able to be generated by the torque output by the second rotating electric machine.

3. The hybrid vehicle according to claim 2, wherein the predetermined acceleration is generated by the torque output by the engine and the torque output by the second rotating electric machine after shifting from the EV traveling mode to the parallel traveling mode.

4. The hybrid vehicle according to claim 1, wherein the control device is configured to
    determine, when electric power supplied from the power storage device and the first rotating electric machine to the second rotating electric machine is equal to or greater than electric power of the second rotating electric machine required to generate the predetermined acceleration, that the predetermined acceleration is able to be generated by the torque output by the second rotating electric machine.

5. The hybrid vehicle according to claim 4, wherein the predetermined acceleration is generated by the torque output by the second rotating electric machine using the electric power supplied from the power storage device and the first rotating electric machine to the second rotating electric machine after shifting from the EV traveling mode to the series traveling mode.

6. The hybrid vehicle according to claim 1, wherein the control device is configured to determine, when electric power supplied from the power storage device alone to the second rotating electric machine is equal to or greater than electric power of the second rotating electric machine required to generate the predetermined acceleration, that the predetermined acceleration is able to be generated by the torque output by the second rotating electric machine.

7. The hybrid vehicle according to claim 6, wherein the predetermined acceleration is generated by the torque output by the second rotating electric machine in the EV traveling mode.

8. The hybrid vehicle according to claim 1, wherein the control device is configured to set the predetermined acceleration using a predetermined function representing relationship between the vehicle speed and the predetermined acceleration.

9. The hybrid vehicle according to claim 1, wherein the control device is configured to set the predetermined acceleration using a map representing relationship between the vehicle speed and the predetermined acceleration.

* * * * *